United States Patent [19]

Kellar et al.

[11] Patent Number: 4,511,386
[45] Date of Patent: Apr. 16, 1985

[54] DEFORMABLE VACUUM HOLDER USED TO SHAPE GLASS SHEETS

[75] Inventors: John D. Kellar, Pontypool; Gordon F. Pereman, Columbus, both of Canada

[73] Assignee: PPG Industries, Inc., Pittsburgh, Pa.

[21] Appl. No.: 496,223

[22] Filed: May 24, 1983

[51] Int. Cl.³ ............................................ C03B 23/035
[52] U.S. Cl. ...................................... 65/273; 65/287; 65/104; 65/106; 294/64.1; 414/121
[58] Field of Search ................. 65/104, 106, 273, 287; 294/64.1; 414/121

[56] References Cited

U.S. PATENT DOCUMENTS

| | | | |
|---|---|---|---|
| 3,328,151 | 6/1967 | Richardson | 65/287 |
| 4,229,199 | 10/1980 | Seymour | 65/106 |
| 4,277,276 | 7/1981 | Kellar et al. | 65/106 |
| 4,282,026 | 8/1981 | McMaster et al. | 65/273 |
| 4,297,118 | 10/1981 | Kellar et al. | 65/104 |
| 4,349,375 | 9/1982 | Kellar et al. | 65/104 X |
| 4,389,064 | 6/1983 | Laverriere | 294/64.1 |

*Primary Examiner*—Arthur Kellogg
*Attorney, Agent, or Firm*—Andrew C. Siminerio; Edward I. Mates

[57] ABSTRACT

A deformable vacuum holder having a glass facing wall of flexible sheet material subject to local distortion for shaping heat-softened material, such as glass sheets, has a deformable sheet of insulator material attached mechanically to said glass facing wall for engaging the flexible glass facing sheet wall of the vacuum holder. The deformable sheet has a smooth surface less subject to distortion than said glass facing wall facing the engaged glass sheet surface to avoid having scratches and other surface irregularities of the glass facing wall mar the vision area of the shaped glass sheet and is mechanically supported against the flexible sheet wall beyond the margin of the engaged glass sheet instead of being adhered to said flexible sheet wall.

16 Claims, 9 Drawing Figures

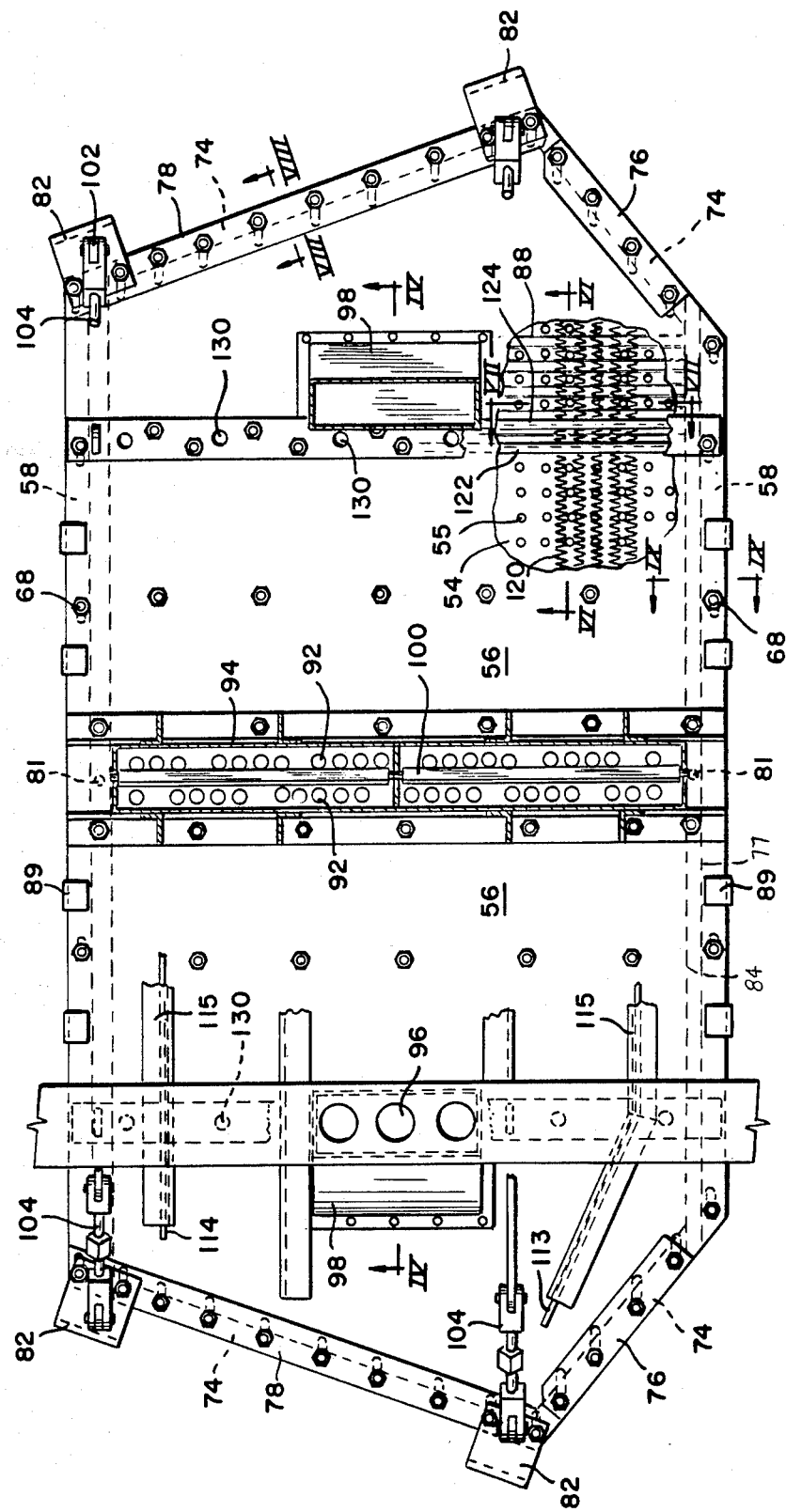

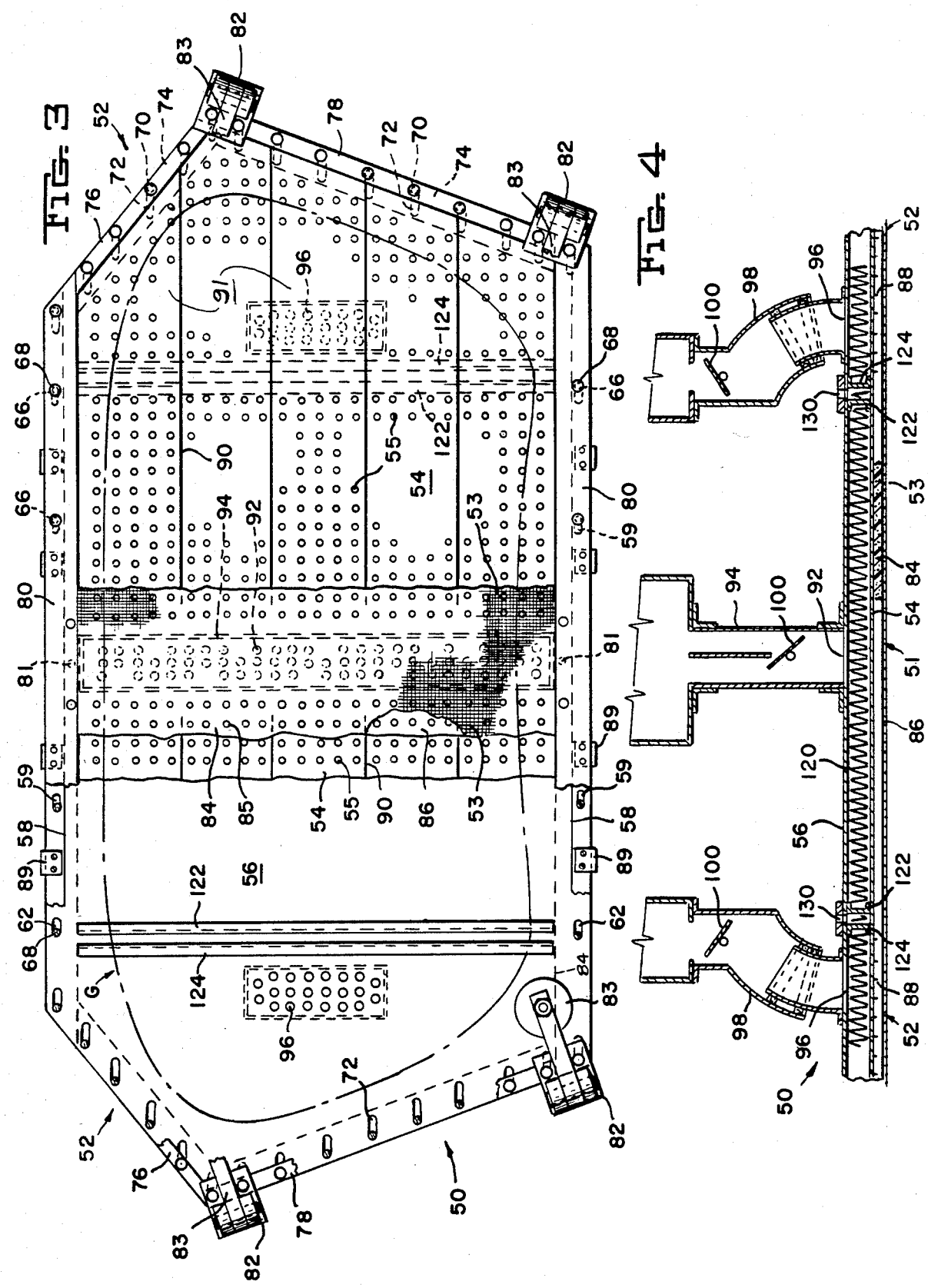

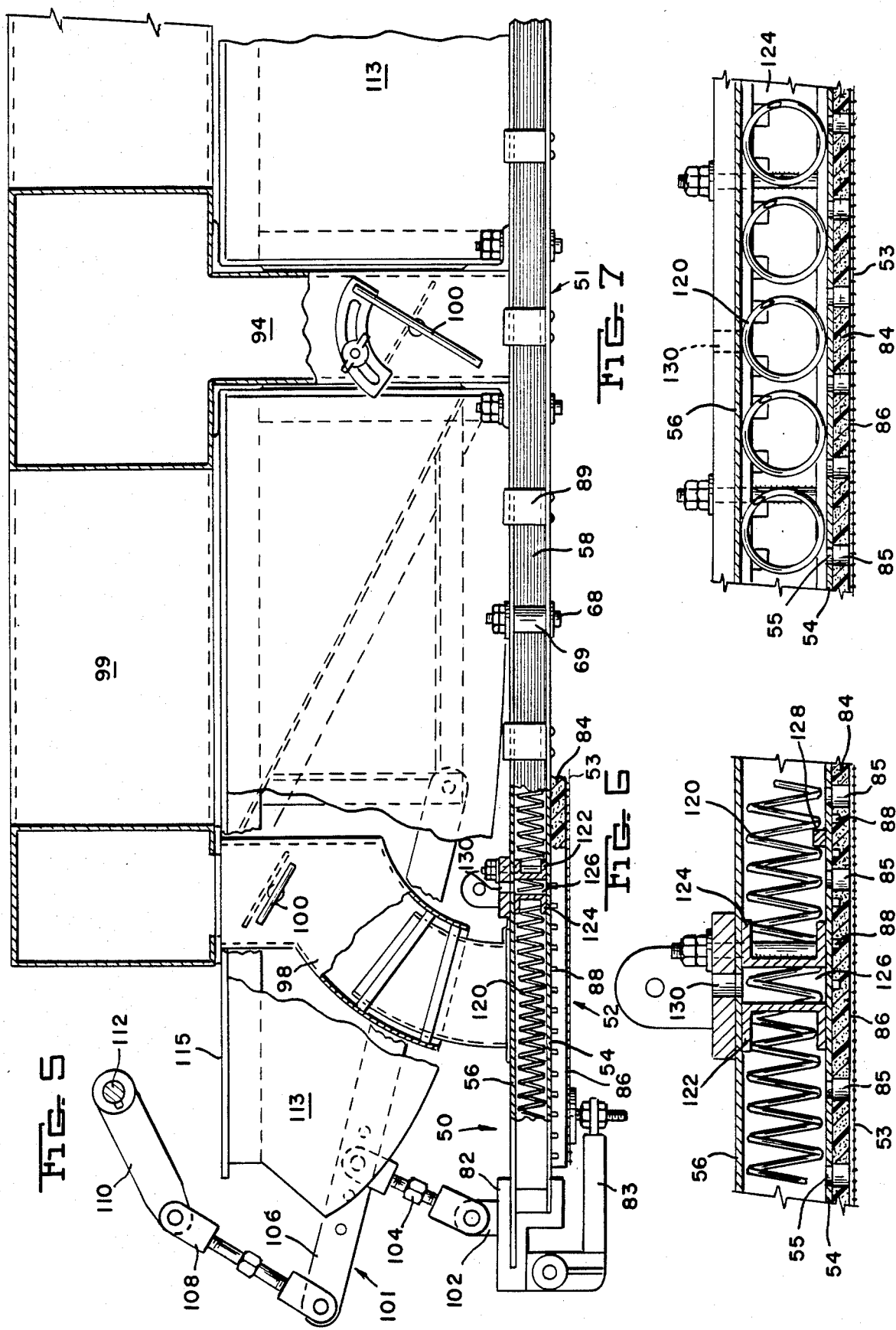

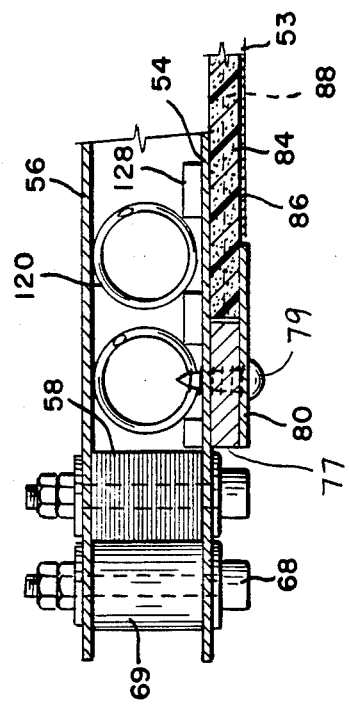
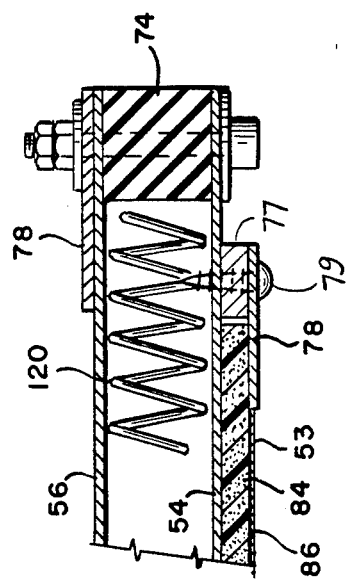

DEFORMABLE VACUUM HOLDER USED TO SHAPE GLASS SHEETS

RELATION TO OTHER CASES

A preferred embodiment of the present invention may also contain other inventions described and claimed in the following copending applications, all of which are filed on the same date.

Vacuum Holder with Anti-Bulging Means for Shaping Glass Sheets, disclosed and claimed in U.S. patent application Ser. No. 496,224, of John D. Kellar and Gordon F. Pereman.

Deformable Vacuum Holder with Helical Coil Springs for Shaping Glass Sheets, disclosed and claimed in U.S. patent application Ser. No. 496,225, of John D. Kellar and Gordon F. Pereman.

Cooling Vacuum Holder by Suction, disclosed and claimed in U.S. patent application Ser. No. 496,222, of John D. Kellar and Gordon F. Pereman.

Arrangement of Apertures for Vacuum Holders for Shaping Glass Sheets, disclosed and claimed in U.S. patent application Ser. No. 496,226, of John D. Kellar and Gordon F. Pereman.

Multiple Chamber Vacuum Holder Used to Shape Glass Sheets with Means to Isolate Adjacent Vacuum Chambers, disclosed and claimed in U.S. patent application Ser. No. 496,221, of Robert G. Frank and John J. Ewing.

BACKGROUND OF THE INVENTION

1. Field of the Invention

This invention relates to shaping sheets of deformable materials, such as glass sheets, and particularly relates to the high speed production of bent glass sheets that are toughened by air quenching, and most particularly, for shaping and heat treating relatively thin glass sheets, particularly those having a nominal thickness of ⅛ inch (3.2 mm) or less. Thinner glass sheets sag more readily than thicker glass sheets at any given elevated temperature above the glass deformation temperature. Hence, it is more difficult to control the shape imparted to thinner glass sheets.

Shaped and tempered glass sheets are widely used as side windows or rear windows in vehicles such as automobiles or the like and, to be suitable for such application, flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects that would tend to interfere with the clear viewing therethrough in their viewing areas.

During fabrication, glass sheets intended for use as shaped windows in vehicles are subject to thermal treatment to temper the glass for strengthening the glass and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of said path into a shaping station (located either within the furnace or immediately beyond the furnace) where each glass sheet in turn is transferred onto a vacuum holder. The vacuum holder holds the heat-softened glass sheet thereagainst by suction. At about the same time, a transfer and tempering ring having an outline shape conforming to that desired for the glass sheet slightly inboard of its perimeter moves upstream into a position below the vacuum holder. Release of the vacuum deposits the glass sheet onto the tempering ring. The tempering ring supports the peripheral portion of the glass sheet while it conveys the glass sheet into a cooling station for rapid cooling.

In prior art apparatus, the vacuum mold was either provided with a lower, rigidly curved shaping surface that shaped the heat-softened glass sheet incrementally by suction thereagainst or had a smoothly surfaced flat shaping surface that lifted the flat glass sheet by suction thereagainst and depended on a release of the vacuum within the mold to permit the hot glass sheet to drop by gravity or by replacing the vacuum with positive pressure to drop the glass sheet by a combination of gravity and an additional force onto the tempering ring to develop the shape dictated by the outline configuration of the tempering ring. The latter processes have been called drop forming.

When a rigid, curved surface is adjacent a heat-softened flat glass sheet during the application of suction through said surface, much power is needed to obtain the suction necessary to lift and shape a hot glass sheet simultaneously by suction at a rate sufficiently rapid to provide a high speed mass production operation for shaping and tempering glass sheets. The glass sheet bending art has developed distortable vacuum holders that normally have a smooth, flat lower perforated surface and engage the upper surface of one or more flat glass sheets by suction and distort the engaged heat-softened glass sheets to a desired shape as they lift the engaged glass sheets. A ring-like member having both an outline shape and elevational configuration desired for the glass sheet shuttles to a position below the vacuum holder. When vacuum is either stopped or replaced by a positive downward pressure, the glass sheet drops onto the ring-like member for conveyance thereon to a cooling station where the hot bent glass sheet is cooled sufficiently rapidly to impart a temper to the sheet.

Vacuum holders with flexible metal walls having scratched surfaces mar a heat-softened glass sheet when they engage the glass sheets with vacuum. Covers of fibrous material having a smooth glass facing surface have been bonded by adhesive to the lower wall of nonmetallic vacuum holders. However, adhesive used prior to this invention has not been able to retain its adhesive properties to deforming metal vacuum holders at varying elevated temperatures for sufficient time to be suitable for mass production because of the need for frequent replacement of the adhesive when the latter is exposed to elevated temperatures required for glass sheet shaping.

2. Description of Patents of Interest

U.S. Pat. No. 4,277,276 to John D. Kellar and Gordon F. Pereman discloses glass sheet shaping and tempering apparatus that comprises a deformable vacuum holder having a glass engaging surface as smooth as that of flat vacuum molds of the prior art, and that also shapes the glass sheet to a shape approximately its final desired shape adjacent a heating furnace before releasing the glass sheet onto a shaping and tempering ring to make it possible to increase the speed of a mass production operation for shaping and tempering glass sheets, particularly those thinner than 3.2 mm nominal thickness.

U.S. Pat. No. 4,282,026 to Harold A. McMaster, Norman C. Nitschke and John S. Nitschke discloses bonding a board of fibrous material to a rigid vacuum holder of ceramic composition in glass sheet bending apparatus that uses a vacuum holder in the glass shaping process. The adhesive bond is not durable enough to adhere a board of fibrous material to a deformable metal sheet surface at elevated temperature cycles required to shape glass sheets against a deformable vacuum holder.

Whenever thin glass sheets are shaped within a heating furnace by sandwiching between pressing molds of complementary shape, such a process saves energy because it avoids the need to overheat the glass, which is necessary to overcome the rapid cooling of the glass sheet that takes place en route to a shaping station located outside the furnace. However, it is difficult to control the shape and temperature of vacuum molds permanently installed within a furnace. It is also difficult to obtain access to repair or to provide maintenance for a mold that is permanently installed within a furnace.

U.S. Pat. No. 4,297,118 to John D. Kellar and Gordon F. Pereman provides a glass sheet shaping method using apparatus that comprises an upper vacuum holder that first engages and lifts a heat-softened glass sheet by suction, and that provides clearance for a shaping and tempering ring to enter the shaping station. The glass sheet shaping station of this patent is located within the heating furnace. The vacuum mold that is used to engage and lift a heat-softened glass sheet by suction is moved outside the furnace between successive bending operations. Such movement cools the vacuum mold intermittently. Such intermittent cooling helps to control the temperature rise somewhat and consequently the shape of the vacuum mold departs only a limited amount from its desired shape during a mass production campaign that uses this patented invention.

U.S. Pat. No 4,349,375 to John D. Kellar and Gordon F. Pereman discloses other apparatus that comprises a more durable, deformable vacuum holder capable of assuming a flat configuration suitable for engaging a flat glass sheet by suction and deforming into a curved configuration. Despite the utility of apparatus of this type that has been demonstrated in commercial operations, room exists for further improvement in results obtained using vacuum holders, such as providing vacuum holders that require less frequent maintenance during elevated cyclic temperature conditions associated with glass sheet shaping, reducing bulging of the vacuum holders to limits acceptable to the customer, providing even more uniform, repetitive deformation of the vacuum holder than before, avoiding collapse of the vacuum holder, providing more efficient cooling of the holder between shaping cycles, avoiding misalignment of glass sheets with the distorted shape of the vacuum holder and helping maintain different levels of vacuum in adjacent vacuum chambers of multiple chamber vacuum holders.

SUMMARY OF THE PRESENT INVENTION

The present invention relates to a vacuum holder used to shape a glass sheet either within a furnace or immediately beyond a furnace through which glass sheets are conveyed into alignment below said holder for vacuum engagement. Release of vacuum or replacement of vacuum with positive downward pressure transfers the glass sheet onto a ring or ring-like member for transfer to a cooling station. In the latter location, the glass sheet is cooled rapidly enough to develop at least a partial temper in each glass sheet supported in turn on the ring-like member.

The present invention provides improvement in glass sheet bending using a deformable vacuum holder having upper and lower flexible, metal sheet walls separated by spacer means as will be better understood in the light of a description of a preferred illustrative embodiment and variations thereof that follows. When deformable vacuum holders are used, the vacuum engagement continues as the vacuum holder and its engaged glass sheet become distorted in unison. The present invention insures that the upper surface of the glass sheet retains its smoothness by mechanically supporting, rather than by adhering, a smoothly surfaced insulator sheet against the lower flexible metal sheet wall of a vacuum holder to control the temperature increase of the lower flexible wall of the deformable vacuum holder during mass production. Supporting the smoothly surfaced insulator sheet wall to the lower flexible wall of the vacuum holder keeps the latter from separating when an adhesive bond breaks in response to a temperature change. The support encompasses the edge of the smoothly surfaced insulator sheet within the periphery of the lower flexible sheet wall and clamps the smoothly surfaced insulator sheet to the lower flexible sheet wall beyond the outline of a vacuum supported glass sheet.

Another problem that exists with vacuum holders used to shape glass sheets is that, during an extended campaign of shaping glass sheets on a mass production basis, the lower flexible sheet wall tends to develop a bulge in the dimension transverse to its length. According to another invention included in the preferred embodiment and claimed in a copending application, the lower flexible sheet wall of the vacuum holder is slit longitudinally outward of an unslit central portion to form longitudinally extending strips of limited width that are free to expand transversely of their length from an unslit central region. Thus, any transverse bulge across the width of the lower sheet wall does not exceed the slight bulge of each strip, which is limited to an amount that does not cause distortion beyond acceptable tolerances. Longitudinal bulging is controlled to within acceptable tolerances by connecting side central portions of the upper and lower flexible sheet walls of the vacuum holder with bolts extending through a pair of aligned, round, centrally disposed holes flanked by bolts extending through longitudinally extending slots in at least one of the flexible sheet walls that increase in length according to their distance from said centrally disposed holes.

Another problem that exists with vacuum holders that are deformable is the problem of maintaining the vacuum holder pliable over a wide temperature range so that it readily changes shape between a flat configuration and one conforming to a desired complicated shape. At the same time, the vacuum holder must be strong enough to avoid collapse in its thickness dimension when vacuum is applied thereto. Another invention included in the preferred embodiment comprising the present invention and claimed in a copending application solves these problems by enclosing essentially parallel, longitudinal helical coil springs having a diameter approximately equal to the space between the flexible sheet walls within the vacuum holder, so that the springs serve as spacers between the flexible upper and lower sheet walls of the deformable holder, provide clearance passages for the evacuation of air from the vacuum chamber and flex with the vacuum holder to help distort the latter into a curved shape defined by rigid end forming members that the deformable vacuum holder engages when distorted.

Another problem that exists with a vacuum holder is that it becomes heated to a high temperature due to repetitive engagement with a hot glass sheet during every bending cycle. Removing the holder to a holder retraction station outside the furnace between shaping steps reduces the rate at which the holder becomes heated and thermally expanded to a shape too large for the desired shaping pattern, unless the mass production rate is decelerated to a slow output level by increasing the time spent to cool the holder between shaping steps. Once mass production is kept at an increased rate, a more efficient holder cooling operation becomes necessary. Cooling the vacuum holder by drawing vacuum by suction through the bottom apertured flexible sheet wall when the holder is outside the furnace has been found to be more efficient than merely keeping the glass sheet vacuum support outside the furnace between shaping cycles or merely blowing hot ambient furnace air within the holder through the apertures of the bottom flexible sheet wall when the holder is outside the furnace between shaping cycles, according to another invention incorporated in the preferred embodiment and claimed in another copending patent application.

Another problem that exists using a vacuum holder to help shape flat glass sheets arises when the apertures of the lower sheet wall of the vacuum holder do not form a continuous line of exposed apertures outside of the outline of the glass sheet to be shaped. When the lower apertured sheet wall has no exposed apertures outside one side and/or end of the glass sheet supported nearby for vacuum engagement, the glass sheet will translate in position uncontrollably relative to the array of apertures either in a transverse direction or in a longitudinal direction away from said side free of exposed apertures when vacuum is applied through the array of apertures. Under these conditions, the glass sheet may engage the vacuum holder in a position of misalignment with a position the flat glass must occupy in order to insure proper alignment of the shaped glass sheet with the deformed vacuum holder. In this inventive feature, the bottom flexible sheet wall contains an array of apertures that surrounds the entire outline of the position that the glass sheet to be bent should occupy when vacuum is applied. Unless this precaution is taken, the glass sheet is liable to translate to a position out of alignment with the position it should occupy relative to the array of apertures. Unless the sheet is properly aligned with the array of apertures, it becomes difficult, if not impossible, to install the bent glass sheet in a bent vehicle frame defining a bent opening to be occupied by said bent glass sheet.

Another problem exists when using a vacuum holder having a plurality of vacuum chambers, each of which requires a different level of vacuum to support a glass sheet of complicated shape. This problem arises from the fact that the glass sheet facing surface of the vacuum holder is covered by a porous fiber glass cloth cover that insulates the bottom wall of the holder from direct contact with the heat-softened glass sheet. When different levels of vacuum are applied simultaneously to adjacent vacuum chambers of a vacuum holder covered by a single porous fiber glass cover, air leakage occurs between adjacent chambers through the porous cover that tends to equalize the level of vacuum in adjacent vacuum chambers when the engaged sheet seals the sheet covered portions of the chambers. This tendency to equalize the vacuum level sometimes causes a glass sheet to drop from its position of engagement with the vacuum holder prematurely because the overall level of vacuum that results from this bleeding lowers the overall vacuum level to a level below the level of vacuum needed to maintain the entire glass sheet in vacuum engagement against the holder.

More specifically, when glass sheets are shaped to complicated shapes involving a gently bent main portion and one or more end portions more sharply bent, the level of vacuum needed for a vacuum chamber facing the main portion to support the gently bent portion is much less than that needed for an end vacuum chamber facing an end portion to be sharply bent. When bleeding of vacuum level occurs, the vacuum chamber facing the main portion of the glass sheet develops a level of vacuum greater than is needed to support the glass sheet while the end vacuum chamber loses vacuum. Consequently, the gently bent main portion develops markings replicating the pattern of the fiber glass cover and the sharply bent end portion does not develop the sharpness of bend required.

The last described invention solves the problems just explained by isolating adjacent vacuum chambers of the vacuum holder from one another by including a narrow elongated chamber vented to the atmosphere between each pair of adjacent vacuum chambers. As a result, the level of vacuum in each individual vacuum chamber can be controlled independently of the control exercised for each other chamber.

The following description of a preferred embodiment of the present invention is made to clarify the present invention, and includes the accompanying drawings wherein like reference numbers refer to like structural elements.

BRIEF DESCRIPTION OF THE DRAWINGS

In the drawings forming part of the description that follows,

FIG. 2 is a fragmentary plan view of elements of a vacuum holder included in the apparatus of FIG. 1 with parts omitted to show as many details of the structure of the deformable vacuum shaping holder as possible;

FIG. 3 is a fragmentary bottom plan view looking upward at the vacuum holder of FIG. 2 with certain parts omitted or broken away to show other parts of the apparatus more clearly;

FIG. 4 is a fragmentary, elevational view, partly in section, of the deformable vacuum holder taken along the line IV—IV of FIG. 2, with parts broken away to show as many other parts as possible;

FIG. 5 is an enlarged elevational view partly in section of a portion of the deformable vacuum holder of FIG. 4, showing its deformable shaping surface in its flat configuration to lift and shape a flat glass sheet and with certain parts omitted to show certain interior structural elements;

FIG. 6 is another enlarged sectional view of a smaller portion of the vacuum holder taken along the line VI—VI of FIG. 2;

FIG. 7 is still another sectional view of the vacuum holder taken along the line VII—VII of FIG. 2;

FIG. 8 is a sectional view across an end portion of the vacuum holder along the line VIII—VIII of FIG. 2; and FIG. 9 is a sectional view across a side portion of the vacuum holder taken along the line IX—IX of FIG. 2.

DESCRIPTION OF THE PREFERRED EMBODIMENTS

Figure 1:
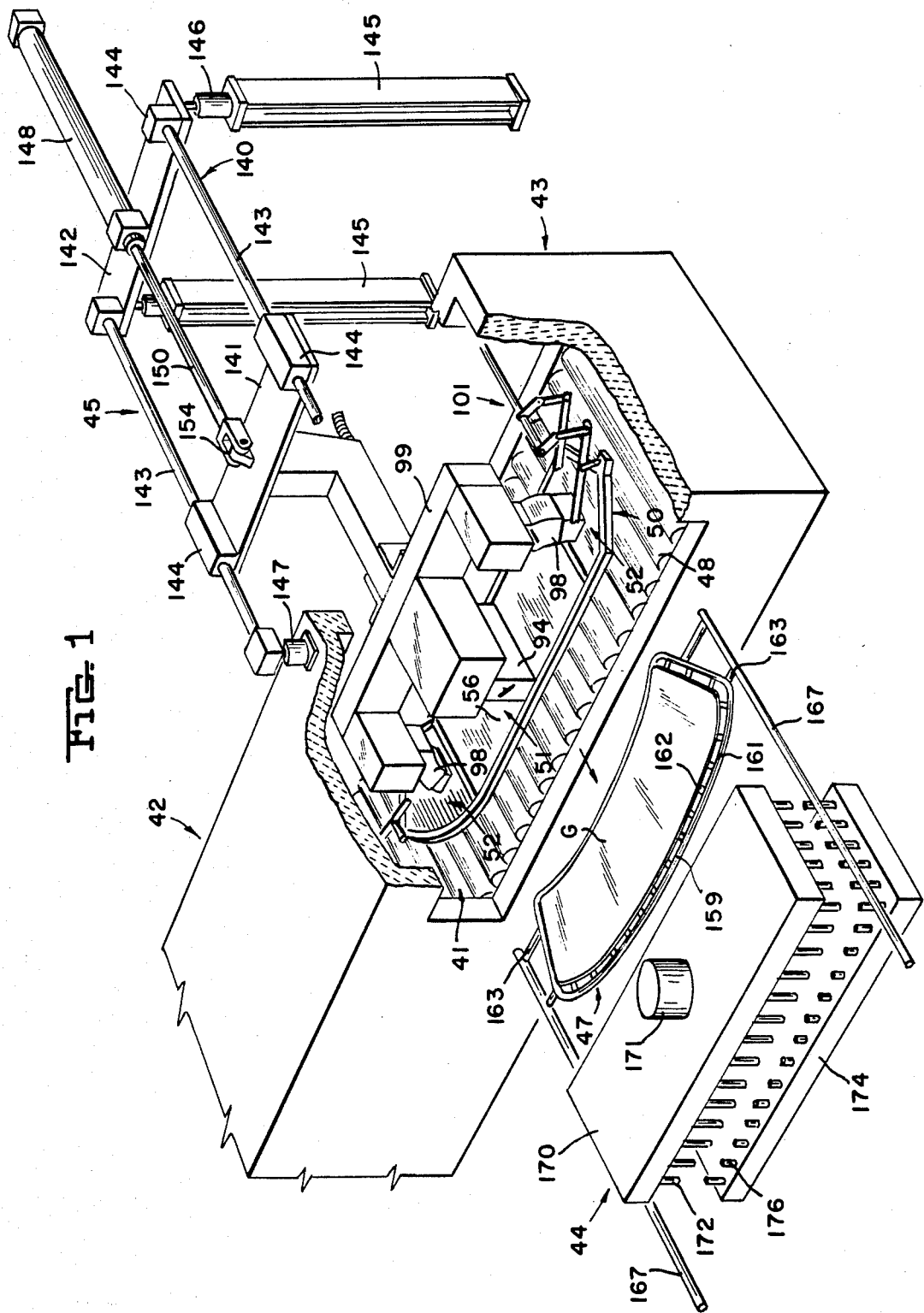
FIG. 1 is a fragmentary, perspective view of apparatus for shaping and tempering glass sheets incorporating a preferred embodiment of the present invention comprising a shaping station located within a roller hearth furnace, with certain parts omitted for clarity.

Referring now to FIG. 1 of the drawings, an apparatus for heating and shaping sheets of heat-softened material, such as glass, includes conveyor means 41 extending through a heating means comprising a tunnel-type furnace 42 (the exit end of which is shown). The furnace includes a shaping station 43 to which sheets of glass are conveyed along the conveyor means 41 from a loading station (not shown) while being heated to the glass deformation temperature. A cooling station generally indicated at 44 for cooling the curved sheets of glass and an unloading station (not shown) beyond the cooling station 44 are located in end-to-end relation along a transverse path to one side of the shaping station 43. A holder retraction station 45 is located at the other side of the shaping station 43, which is the side opposite the cooling station 44. A sheet transfer means 47 shown beside the shaping station 43 transfers glass sheets between the shaping station 43 and the cooling station 44.

Heat may be supplied in the furnace 42 by hot gases from gas burners or by electrical radiant heaters or by a combination of both, which heat supply means are well known in the art. Bearing housings (not shown) adjacent the furnace side walls support bearings for longitudinally spaced, transversely extending conveyor rolls 48 that define a path of travel for conveyor means 41 which extends the length of furnace 42. Some of the conveyor rolls 48 are located at the shaping station 43 to form a continuation of the path of travel within the furnace 42. The rolls of the conveyor means 41 are arranged in sections and their rotational speed controlled by clutches (not shown) so that the speed of the different conveyor sections may be controlled and synchronized in a manner well known in the art.

One or more glass sensing elements (not shown) are located a short distance upstream of the shaping station 43 to initiate a cycle of operation of this apparatus in a manner well known in the art. Limit switches or electronic counter circuits may be provided to synchronize the operation of various elements of the apparatus according to a predetermined sequence. Since their arrangement and manner of operation are not part of this invention, they will not be described in detail herein.

The shaping station 43 comprises a deformable upper vacuum holder 50 in the form of a deformable metal box. The latter is divided into a central chamber 51 flanked by end chambers 52. A blanket 53 of flexible, porous refractory material, such as fiber glass, is tightly clamped for biasing against the bottom of the vacuum holder 50 in a manner well known in the art.

The deformable metal box comprises a flexible, apertured, lower metal sheet wall 54 having perforations 55 distributed throughout and an upper metal sheet wall 56 that is also flexible but has apertures therethrough at critical locations only, as will be explained later. The metal sheet walls 54 and 56 form flexible lower and upper sheet walls of the deformable vacuum holder 50. Upper and lower flexible sheet walls 54 and 56 are of half hard tempered sheet steel, and are of essentially polygonal outlines and sufficiently larger than the glass sheets to be shaped to provide a frame-like area beyond the glass sheet outline. The latter is illustrated in dashed lines in FIG. 3.

A suitable array of perforations 55 is a checkerboard pattern arranged on one inch (2.5 centimeters) centers, except for two transversely extending areas. A suitable diameter for each perforation is 0.172 inches (4.635 millimeters).

The longitudinal side edges of the flexible metal sheet walls 54 and 56 are separated along their length by a pair of laminated springs 58 (see FIG. 9). The latter are constructed of thin flexible layers of strip metal to form flexible laminated spacers ¾ inch (19 millimeters) thick. The laminated springs 58 extend inside and adjacent the longitudinal side edges of the holder 50 and have a symmetrical arrangement of longitudinal slots 59 of increasing length with increasing distance from the longitudinal center of the holder 50 along the length of the laminated springs 58. The longitudinal slots 59 coincide with elongated slotted apertures 62 extending vertically through the longitudinal side portions of the upper flexible metal sheet wall 56. The lower flexible metal sheet wall 54 has round apertures 66 spaced adjacent the opposite longitudinal sides thereof in alignment with the corresponding longitudinal slots 59 and slotted apertures 62 to receive attachment bolts 68. The latter extend through spacer sleeves 69. The latter are ¾ inch (19 millimeters) high to maintain the longitudinal edges of sheet walls 54 and 56 separated while interconnected.

Along each of the oblique sides at each end of the vacuum holder 50, the lower flexible sheet wall 54 has a series of spaced holes 70, each coinciding with a corresponding elongated, longitudinally slotted opening 72 of maximum length in the upper flexible metal plate. A rubber spacer 74 for each oblique side (FIG. 8) defines the gap between the corresponding oblique ends of the flexible metal sheet walls 54 and 56. In addition, rigid end bars 76, special rigid end bars 78, and rigid side bars 80 help secure the flexible metal sheet walls 54 and 56 together. Each laminated spring 58 has a centering hole 81 at its longitudinal center to fix the longitudinal center lines of sheet walls 54 and 56 in alignment at their geometric centers. A plate 82 is fixed to each end of each special end bar 78. A clamp 83 is pivotally attached to each plate 82. An apertured sheet 84 similar in outline to, but slightly smaller than flexible metal sheet walls 54 and 56, is composed of insulator material to provide thermal insulation between the lower flexible metal sheet wall 54 and a hot glass sheet engaged thereto by vacuum.

The rigid bars 76, 78 and 80 cooperate with frame members 77 (see FIGS. 8 and 9) secured to lower flexible sheet wall by self tapping screws 79 to help support the apertured sheet 84 of impregnated fibrous, flexible material, such as a random fiber glass mat impregnated with a cured polyester resin (which is more rigid than metal sheet wall 54), below the flexible metal sheet wall with the outline of said apertured sheet 84 within the marginal portion of the vacuum holder 50 and aligned with a frame defined by the laminated springs 58 and the rubber spacers 74. The apertured sheet 84 has apertures 85 corresponding to and aligned with the apertures 55 in flexible lower metal sheet 54.

The array of apertures 55, 85 encompasses a larger area than that of the glass sheet undergoing shaping and tempering. It is important that the boundary portion of the array of apertures surrounding the outline of the glass sheet form at least one row of essentially uniformly spaced apertures exposed to the atmosphere. Unless this feature is included, when vacuum is applied to holder 50 to engage a flat glass sheet, the latter will translate sidewise and/or lengthwise into a position where its outline may be arranged out of alignment with respect to its desired position against the holder. Unless the apertures 55 and 85 are provided over an area large enough to insure that apertures exposed to the atmosphere surround the entire periphery of the flat glass sheet initially, a chance exists that the misaligned glass sheet will be shaped to an undesired configuration because of this uncontrolled translation, and will not fit properly in an auto frame.

A heat-reflecting coating 86 of aluminum paint or other heat-reflecting material is applied to the bottom surface of the apertured sheet 84. The heat reflecting properties of the coating 86 and the thermal insulation properties of the apertured sheet 84 moderate the temperature changes in vacuum holder 50 during repeated cycles of temperature experienced during mass production of bent, tempered glass sheets.

Transverse grooves 88 extend across the width of critical portions of the apertured sheet 84 along its upper surface to promote additional flexibility in those portions. The bottom surface of apertured sheet 84 is smooth and resists local deformation to a greater extent than the flexible lower metal sheet wall 54. Hence, the glass sheets are less likely to develop optical distortion in their upper surfaces when apertured sheet 84 is interposed between the glass sheet and flexible metal sheet wall 54 then when the apertured sheet 84 is omitted.

Holes corresponding to the centering holes 81 are located in corresponding positions adjacent the longitudinal sides of apertured sheet 84, and extend through the lower flexible sheet wall 54, and the upper flexible sheet wall 56 and the laminated springs 58. A pair of connecting bolts extend through these corresponding holes to secure the sheets and springs to one another on a pair of transversely spaced points along the longitudinal center line of the vacuum holder 50. This enables the vaccum holder to expand thermally in each longitudinal direction from its longitudinal center line equal distances so as to minimize the chance of warpage of the lower sheet 54 which faces the glass sheets to be shaped.

C-shaped clips 89 (FIGS. 2 and 4) slide over spaced portions of the margin of the flexible holder 50 with their lips overlapping the outer surfaces of flexible sheets 54 and 55. Self-tapping screws are threaded through the bottom lips to engage the lower sheet 54 only beyond the outer edges of laminated springs 58 and rubber spacers 74. The apertured sheet 84 is dimensioned to have its outer peripheral edge abut the inner edges of laminated springs 58 and rubber spacers 74. Additional bolts 68 extend through spacer sleeves 69 of fixed height (¾ inch-19 millimeters) to interconnect the marginal portions of sheets 54 and 56 between clips 89.

The lower flexible sheet wall 54 has longitudinal cuts 90 extending to each longitudinal end from an uncut central portion. These longitudinal cuts form flexible strips 91 of limited width, for example, about 5 inches (12.7 centimeters) maximum width, that limit transverse distortion of the lower, thin, flexible, metal sheet wall 54 when the vacuum holder 50 is heated from a room temperature configuration at which the holder is assembled to a higher temperature range that is developed during an extended mass production campaign. The presence of the smoothly surfaced apertured sheet 84 coated on its glass facing surface with a thin heat-reflecting film 86 and the porous fiber glass covers 53 thereagainst lessens the temperature range established in the vacuum holder 50 during an extended campaign. In addition, the sheet 84, being of a composition less likely to develop surface distortion at elevated temperatures than the flexible metal sheet 54, protects the heat-softened glass sheets from replicating any surface marks in the flexible metal sheet 54 due to scratches and other flaws.

The upper flexible sheet wall 56 has central apertures 92 communicating the central vacuum chamber 51 with a central vacuum duct 94, and end chamber apertures 96, one for each end chamber 52. The latter apertures 96 communicate with flexible end vacuum ducts 98. The vacuum ducts 94 and 98 communicate with a vacuum source (not shown) through a common plenum 99. Each vacuum duct 94 and 98 is provided with a control valve 100. This arrangement enables individual control for vacuum applied to chambers 51 and 52. If desired, the common plenum 99 may be adapted for selective connection to a vacuum source or a pressure source. The latter may be used to help separate a shaped glass sheet of more complicated shape from the flexible holder 50 after the sheet has been sucked by vacuum to conform to the shape of the lower flexible sheet wall 54.

A linkage system 101 is associated with each plate 82 to help distort the vacuum holder 50 at each of four corner portions thereof. Each plate 82 carries a pivot member 102 (FIG. 5) on which is pivotally mounted the lower end of a first link 104 of adjustable length. The latter is pivotally mounted at its upper end to an apertured arm 106. The latter has several spaced holes to adjust its pivotal connection to the first link 104. A second link 108 of adjustable length is pivotally connected at its lower end to apertured arm 106. A cam arm 110 is pivotally connected to the upper end of second link 108. Cam arm 110 is fixed to a drive shaft 112 of a motor (not shown). The latter together with a plurality of rigid end forming members 113 and 114 (see FIG. 2) are supported from overhead support structure 115. The end forming members have lower, curved surfaces defining a shape desired for sharply bent end portions of the bent glass sheets.

Rotation of the drive shafts 112 causes the linkage system just described to apply force on the respective plates 82 to raise the latter and cause the longitudinal end portions of the holders 50 to distort upwardly to develop a concave elevational configuration at each end chamber 52 that conforms to the shape of the end forming members 113 and 114, or to lower the plates 82 to reduce the severity of bend imparted to the holder 50 until the bottom surface of the apertured sheet 84 is flat.

The fiber glass cover 53 is biased against the heat reflecting aluminum coating 86 applied to the bottom surface of apertured sheet 84 and the latter is mechanically secured to the flexible metal sheet 54 near its periphery so that the cover 53 assumes whatever shape is imparted to the bottom surface of lower flexible metal sheet 54. To control a more complex shape imparted to the holder 50, a pair of end forming members 113 and 114 of different configurations is supported from support structure 115 above each end of the holder 50. Each forming member 113 and 114 has a lower surface of desired shape for the side end portion of a shaped glass sheet that engages the upper surface of the upper flexible metal sheet 56 when the latter is lifted.

Since the lower flexible metal sheet wall 54 and plate 84 have aligned perforations, and cover 53 is porous, when suction is applied through the common plenum to the deformable vacuum holder 50, a flat glass sheet G having arrived on the conveyor rolls 48 to a shaping position below the deformable vacuum holder 50 is sucked by vacuum into engagement against the porous fiber glass cover 53 backed by the flexible apertured sheet 84 and the lower flexible metal sheet wall 54. When the drive shafts 112 are simultaneously rotated to deform the vacuum holder 50 upwardly at its ends, the upper flexible metal sheet wall 56 bears upward against the curved lower surfaces of the rigid end forming members 113 and 114, thereby distorting the deformable vacuum holder 50 to conform to the shape of their curved lower surfaces. The glass sheet, being heat softened, and being sucked into engagement against the lower flexible metal sheet wall 54, assumes the deformed shape of the lower flexible sheet wall.

When the end portions of the vacuum holder defined by the end chambers 52 are curved sharply and the central portion defined by the central chamber 51 is essentially flat, it is necessary to apply a relatively high vaccum to the end portions of the glass sheet and a relatively low vacuum to its central portion. The control valves 100 for each chamber are individually and independently adjusted to provide a weak vacuum in chamber 51 and stronger vacuums in end chambers 52.

To insure against the sheets 54 and 56 collapsing toward one another when suction is applied to the vacuum holder 50 even when the vacuum holder is distorted in shape, a plurality of longitudinally extending helical coil springs 120 are provided. The springs 120 extend in side by side relation along the length of the vacuum holder. Preferably, the outer diameter of the springs 120 approximates the vertical space between the upper and lower flexible sheet walls 56 and 54.

Whenever the chambers 51 and 52 are subjected to different levels of vacuum, the porous fiber glass cover 53 provides a conduit tending to equalize the level of vacuum in adjacent chambers. To avoid this leakage, the chambers are isolated from one another in a manner to be described.

A pair of channel shaped members 122 extend across essentially the entire width of sheets 54 and 56 to define the outer ends of the central vacuum chamber 51 and another pair of similar channel shaped members 124 defines the inner ends of each end vacuum chamber 52. Channel shaped members 122 and 124 are arranged in spaced mirror-image pairs to provide narrow transversely extending spaces 126 that isolate the central vacuum chamber 51 from the end vacuum chambers 52.

Spacer tabs 128 are fixed to the upper surface of the bottom flexible sheet 54 to help separate the helical coil springs 120 from one another. In addition, the helical coil springs extend through holes, drilled through the bases of the channel shaped members 122 and 124 and later filled after the coil springs 120 are threaded therethrough.

Vent holes 130 are provided across the upper flexible sheet wall 56 over each transverse space 126. These vent holes are especially important when the deformable vacuum holder 50 is deformed to a shape that requires a different level of vacuum in adjacent vacuum chambers 51 and 52. Venting the spaces 126 to atmosphere under such circumstances isolates adjacent vacuum chambers 51 and 52 from one another to avoid a loss in vacuum differential between end chambers 52 and central chamber 51. This enables the holder 50 to have a different cycle of level of vacuum for the central vacuum chamber 51 than those imparted to the end vacuum chambers 52, which is very important during the shaping of glass sheets having sharply bent end portions.

The common plenum 99 is connected to a carriage 140 (see FIG. 1), which is fixed for vertical movement with the deformable vacuum holder 50 is whatever shape it is forced to assume by the arrangement of the linkage system 101. In order to provide the vertical adjustment feature for positioning the deformable vacuum holder 50, the carriage has a front support beam 141, a rear support beam 142, a pair of slide bars 143, and a pair of slide bar housings 144 supported on each support beam.

Each rear support beam 142 is supported on a pair of vertical posts 145. The posts 145 support rear vertical pistons 146, which act in unison with a pair of front vertical pistons 147 mounted on the roof of the furnace 42 at shaping station 43 to raise or lower the front and rear support beams 141 and 142 and their supported slide bar housings 144. Such actuation raises or lowers the deformable vacuum holder 50 in the shaping station 43.

A horizontal piston 148 is connected through a piston rod 150 to a lug 154 fixed to front support beam 141. Actuation of the horizontal piston 148 moves the deformable vacuum holder 50 between the shaping station 43 and the mold retraction station 45.

The sheet transfer means 47 comprises a ring-like member 159 conforming in elevation and plan outline to the shape desired immediately inward of the peripheral edge of a glass sheet to be shaped at the shaping station 46. The ring-like member 159 is surrounded by a pipe type reinforcement 161. The ring-like member has an upper edge surface that is notched or serrated to minimize contact with the glass and preferably is constructed in the manner of U.S. Pat. No. 3,973,943 to Samuel L. Seymour, the disclosure of which is incorporated herein by reference. Connectors 162 are provided around the periphery to interconnect the ring-like member 159 and the reinforcement 161. Extension arms 163 extend outward from the opposite longitudinal ends of the outline formed by the sheet transfer means 47 and terminate in connections to cantilevered rods 167 which are actuated for movement in unison by motor drive means (not shown) to move the ring-like member 159 from shaping station 43 through cooling station 44 to an unloading station (not shown) and a return to the shaping station 43.

The cooling station 44 comprises an upper plenum 170 connected to an air supply duct 171 which delivers air under pressure from a source of tempering medium (not shown) to said upper plenum 170 for delivery through downwardly directed pipe nozzles 172 toward the upper surface of a glass sheet supported on said ring-like member 159. Additional tempering medium supply means communicates with a lower plenum 174 which is provided with upwardly directed nozzles 176 for supplying the tempering medium such as pressurized air against the lower surface of a glass sheet supported on said ring-like member 159.

CYCLE OF OPERATION

A plurality of glass sheets are conveyed through the furnace 42 while supported on rotating furnace conveyor rolls 48. When a glass sheet is sensed to be in proper position, the apparatus is ready to begin a shaping cycle.

The glass sheet travels rapidly along the conveyor rolls 48 into the shaping station as the horizontal piston rod 150 extends to move the vacuum holder 50 into vertical alignment over a glass sheet shaping position at the shaping station 43. The deformable holder 50 is in its flat configuration and vacuum is started to lift the hot, flat glass sheet into engagement against the deformable vacuum holder 50 when the latter is flat and supported in a lowered position by extension of vertical pistons 146 and 147.

As soon as the flat glass sheet engages the vacuum holder 50, pistons 146 and 147 retract upward in unison to cause the vacuum holder 50 to lift the glass sheet. At the same time, vacuum is increased in the end chambers 52. The drive shafts 112 rotate to cause the vacuum holder 50 to deform upwardly at its longitudinal end portions. Vacuum continues to be applied to the deformed vacuum holder 50 so that the glass sheet continues to engage said vacuum holder as the latter is lifted and shaped to conform to the bottom surfaces of the end forming members 113 and 114.

The sheet transfer means 47 including said ring-like member 159 enters the shaping station 43 immediately after the vacuum holder 50 lifts and shapes the glass sheet. Entry of the sheet transfer means 47 is correlated with the glass sheet being raised sufficiently to provide clearance for its entry.

The pistons 146 and 147 continue to lift the vacuum holder 50 and the drive shafts 112 continue to rotate until the ring-like member 159 reaches a position in the shaping station 43 under the vacuum holder 50. At that moment, vacuum is released or replaced by a downward positive pressure to drop the glass sheet onto the ring-like member.

The empty vacuum holder 50 is removed in one direction toward the mold retraction station 45 by retraction of piston rod 150 while the drive shafts 112 rotate to cause the deformable holder 50 to resume its flat configuration as the sheet transfer means 47 moves in a direction opposite said one direction with the glass sheet supported on its ring-like member 159 for transfer into cooling station 44.

While the transfer means 47 clears the shaping station 43, the deformable metal holder 50 and its associated reinforcing structure 115 move to holder retraction station 45 where the holder is cooled. In order to improve the efficiency of holder cooling, it is preferred to apply suction through the apertures 55 and 85 of the holder 50 at the holder retraction station 45. This suction introduces cooler air of the atmosphere outside the furnace into the holder 50 between each successive shaping cycle. As a result, the holder is cooled more efficiently than if it is merely exposed to the outside atmosphere or cooled by positive air pressure forcing relatively hot air from within the furnace to pass from the holder 50 through the apertures 55 and 85.

At the cooling station 44, the ring-like member 159 supports the glass sheet between upper and lower plenum chambers 170 and 174 that provide cold air under pressure to the sets of nozzles 172 and 176 in the cooling station until the sheet is cooled sufficiently to impart a desired degree of temper. Then, the ring-like member 159 is unloaded and returned toward the shaping station as the latter awaits the arrival of a succeeding glass sheet that is conveyed through the furnace toward said glass sensing station. The unloaded glass sheet is inspected prior to further handling which may include packaging. The retracted horizontal piston rod 150 is ready to be extended and the apparatus is ready for another cycle of operation.

Various alternative embodiments may be used in the practice of the present invention. For example, any available energy source such as electricity, gas, oil, coal, etc., may be used to heat the glass sheets within the furnace. Any type of conveyor, such as a gas hearth type of conveyor or a conveyor that uses rolls in conjunction with a fluid that compensates for part of the mass of glass rotatably supported on the rolls of a roller conveyor may be substituted for the roller conveyor system for delivering glass sheets to the shaping station. Furthermore, the deformable vacuum mold of the illustrated embodiment that moves vertically may be replaced by a deformable vacuum mold that maintains a fixed position relative to vertically movable conveyor rolls and the ring-like member may be made of spaced rail sections to provide clearance to lower said rolls and drop a glass sheet from the deformable vacuum box onto the ring-like member and provide clearance for the ring-like member to transfer the glass sheet to the cooling station and to return empty to the shaping station before the vertically movable rolls rise to their glass sheet receiving position in time for the arrival of the next glass sheet to be shaped.

In another embodiment contemplated, the deformable vacuum mold may move horizontally instead of vertically from a first mold position above the additional conveyor rolls to a second mold position above the rail-like member and change its configuration during its horizontal movement.

The cooling station may use liquids or other fluids instead of air as the cooling medium and may use slot type nozzles or bar type nozzles instead of or in combination with the pipe-type nozzles shown.

In a typical commercial installation using a vacuum holder sectionalized to comprise three vacuum chambers, the central vacuum chamber only has been used as a vacuum support for making tempered glass sheets bent to relatively gently bent curvatures, and the two end vacuum chambers have been used to make a pair of bent, tempered glass sheets, such as automobile side windows, simultaneously.

It is also understood that while the embodiments described previously relate to shaping and tempering glass sheets, the present invention can be used to shape glass sheets that are to be annealed subsequently. In such a case, the cooling station 44 is replaced by an annealing lehr section wherein the bent glass is cooled at a controlled rate after its shaping.

The form of the invention shown and described in this disclosure represents an illustrative preferred embodiment and certain modifications thereof. It is understood that various additional changes may be made without departing from the gist of the invention as defined in the claimed subject matter which follows.

We claim:

1. A deformable vacuum holder for use in the shaping of a heat deformable material comprising:

a box having an upper sheet wall, a perforated lower sheet wall and a spacer wall means connecting said upper and lower sheet walls in spaced relation to provide a vacuum type chamber, each of said walls being of material of sufficient flexibility to permit said box to be positively deformed to a configuration different from its original configuration;

means adapted to communicate said chamber with a vacuum source;

a flexible perforated sheet of insulated material with performations that remain open during the bending of said mold and shaping of said sheet;

means to mechanically secure said flexible perforated sheet against said perforated lower sheet wall with the perforations of said flexible perforated sheet substantially aligned with the perforations of said lower perforated sheet wall; and means to positively deform said box and said flexible perforated sheet of insulated material.

2. A deformable vacuum holder as in claim 1, wherein said flexible perforated sheet has a smooth bottom surface and said flexible perforated sheet is composed of a material less prone to develop localized surface deviations when distorted than said flexible lower sheet wall.

3. A deformable vacuum holder as in claim 1, wherein said mechanical attachment means is located at spaced points adjacent the perimeter of said holder.

4. A deformable vacuum holder as in claim 3, further including centrally disposed connector means extending through a pair of aligned centering holes through the longitudinally central portion of said upper flexible sheet wall and the corresponding longitudinally central portion of said perforated lower sheet wall.

5. A deformable vacuum holder as in claim 1, wherein said perforated sheet of insulator material being provided with transversely extending grooves in its upper surface facing said perforated lower sheet wall in said regions to enhance the flexibility of said sheet of flexible insulator material in said regions, the lower surface of said last named sheet being smooth to present a smooth surface for pressurized engagement against a heat-softened glass sheet to be shaped in pressurized engagement thereagainst.

6. A deformable vacuum holder as in claim 5, further including a cover of porous flexible fiber glass cloth over said smooth surface.

7. A deformable vacuum holder as in claim 5, futher including a coating of heat-reflecting material applied to the lower major surface of said flexible sheet of insulator material.

8. A deformable vacuum holder as in claim 6, further including a coating of heat-reflecting material applied to the lower major surface of said flexible sheet of insulator material.

9. A deformable vacuum holder as in claim 1, wherein said holder is divided into a plurality of chambers, each chamber communicating with a separate duct and means to control the level of vacuum in each chamber independently of the level of vacuum in each other chamber.

10. A vacuum holder as in claim 2, wherein said mechanical attachment means is located at spaced points adjacent the perimeter of said holder.

11. A vacuum holder as in claim 10, further including centrally disposed connector means extending through a pair of aligned centering holes through the longitudinally central portion of said upper sheet wall and the corresponding longitudinally central portion of said perforated lower sheet wall.

12. A vacuum holder as in claim 2, wherein said perforated sheet of insulator material being provided with transversely extending grooves in its upper surface facing said perforated lower sheet wall in said regions to enhance the flexibility of said sheet of insulator material in said regions, the lower surface of said last named sheet being smooth to present a smooth surface for pressurized engagement against a heat-softened glass sheet to be shaped in pressurized engagement thereagainst.

13. A vacuum holder as in claim 12, further including a cover of porous flexible fiber glass cloth over said smooth surface.

14. A vacuum holder as in claim 13, further including a coating of heat-reflecting material applied to the lower major surface of said perforated sheet of insulator material.

15. A vacuum holder as in claim 12, further including a coating of heat-reflecting material applied to the lower major surface of said perforated sheet of insulator material.

16. A vacuum holder as in claim 2, wherein said holder is divided into a plurality of chambers, each chamber communicating with a separate duct and means to control the level of vacuum in each chamber independently of the level of vacuum in each other chamber.

* * * * *